United States Patent [19]

Siegel et al.

[11] Patent Number: 5,548,718

[45] Date of Patent: Aug. 20, 1996

[54] METHOD AND SYSTEM FOR DETERMINING SOFTWARE RELIABILITY

[75] Inventors: Matthew R. Siegel, Seattle; John I. Ferrell, Bellevue, both of Wash.

[73] Assignee: Microsoft Corporation, Redmond, Wash.

[21] Appl. No.: 178,930

[22] Filed: Jan. 7, 1994

[51] Int. Cl.$^6$ .................................................. G06F 11/00
[52] U.S. Cl. ................................. 395/183.14; 395/183.21
[58] Field of Search ............................. 395/575, 183.14, 395/183.13, 183.01, 183.09, 183.21; 371/19

[56] References Cited

U.S. PATENT DOCUMENTS

| | | | |
|---|---|---|---|
| 4,205,383 | 5/1980 | Bakanovich et al. | 364/554 |
| 4,652,814 | 3/1987 | Grove et al. | 324/73 R |
| 4,696,003 | 9/1987 | Kerr et al. | 371/19 |
| 5,109,350 | 4/1992 | Henwood et al. | 364/550 |
| 5,157,779 | 10/1992 | Washburn et al. | 395/575 |
| 5,193,178 | 3/1993 | Chillarege et al. | 395/575 |
| 5,210,859 | 5/1993 | Aoshima et al. | 371/19 |
| 5,339,430 | 8/1994 | Lundlin et al. | 395/700 |

OTHER PUBLICATIONS

Ehrlich et al "Application of Software Reliability Modeling to Product Quality and Test Process" 1990 IEEE pp. 108–116.

Musa "Operational Profiles in Software—Reliability Engineering" IEEE Software Mar. 1993, pp. 14–32.

Musa "The Operational Profile in Software Reliability Engineering: An Overview" IEEE 1992 pp. 140–154.

Elperin et al "Bayes Credibility Estimation of an Exponential Parameter for Random Censoring & Incomplete Information" IEEE Tran. on Reliability vol. 39 No. 2 1990 pp. 204–208.

Ehrlich et al "Application of Software Reliability Modeling to Product Quality and Test Process" 1990 IEEE pp. 108–116.

Christodoulakis, D. and G. Panziou, "Modelling software reliability prediction with optimal estimation techniques," University of Patras, (Jan./Feb. 1990), vol. 32 No. 1.

Masuda et al., "A Statistical Approach for Determining Release Time of Software System with Modular Structure," *IEEE Transactions on Reliability*, vol. 38, No. 3, (Aug. 1989), pp. 365–372.

Hishitani et al., "Comparison of Two Estimation Methods of the Mean Time–Interval between Software Failures," *IEEE*, (1990), pp. 418–424.

Hishitani et al., "Reliability Assessment Measures Based on Software Reliability Growth Model with Normalized Method," *Journal of Information Processing*, vol. 14, No. 2, (1991), pp. 178–183.

Yamada, Shigeru, "Software Quality/Reliability Measurement and Assessment: Software Reliability Growth Models and Data Analysis," *Journal of Information Processing*, vol. 14, No. 3, (1991), pp. 254–266.

Royer, Thomas, "Software Reliability," *Software Testing Management: Life on the Critical Path*, PTR Prentice–Hall, Inc., (1993), Chapter 14, pp. 176–187.

Walsh, James, "Determining Software Quality," *Computer Language*, (Apr. 1993), pp. 57–65.

(List continued on next page.)

*Primary Examiner*—Robert W. Beausoliel, Jr.
*Assistant Examiner*—Joseph E. Palys
*Attorney, Agent, or Firm*—Seed and Berry LLP

[57] ABSTRACT

An improved system and method for determining software reliability is provided. In a preferred embodiment of the present invention, a mapping mechanism and a preferred automated testing system are used. The mapping mechanism provides for the creation of a number of hits to failure metric. The preferred automatic testing system of the preferred embodiment of the present invention provides for the automatic testing of software and the creation of the number of hits to failure and the elapsed time to failure. The combination of the number of hits to failure metric and the results of the preferred automated testing system provide for a more accurate indication of the reliability of software.

13 Claims, 8 Drawing Sheets

OTHER PUBLICATIONS

Voas et al., "Designing Programs that are Less Likely to Hide Faults," *J. Systems Software*, (1993), 20:93–100.

Voas, Jeffrey M. and Keith W. Miller, "Semantic Metrics for Software Testability," *J. Systems Software*, (1993), 20:207–216.

Musa, John D., "Tools for measuring software reliability," *IEEE Spectrum*, (Feb. 1989), pp. 39–42.

Pfleeger, Shari L., "Measuring software reliability," *IEEE Spectrum*, (Aug. 1992), pp. 56–60.

Poore et al., "Planning and Certifying Software System Reliability," *IEEE Software*, (Jan. 1993), pp. 88–99.

Clapp, Judy, "Getting Started on Software Metrics," *IEEE Software*, (Jan. 1993), pp. 108–109, 117.

Schneidewind, Norman F., "Methodology for Validating Software Metrics," *IEEE Transactions on Software Engineering*, vol. 18, No. 5, (May 1992), pp. 410–422.

Hoshizaki, Dean O., "Risk Based Refinements for the ANSI/IEEE Test Design Specification," (Apr. 1993).

Hamlet, Richard and Voas, Jeffrey M., "Software Reliability and Software Testability," *Conference Proceedings of Quality Week 1993*, Paper 5–T–1&2.

Hamlet, Dick, "Are We Testing for True Reliability?" *IEEE Software*, (Jul. 1992), pp. 21–27.

Ehrlich et al., "Applying Reliability Measurement: A Case Study," *IEEE Software*, (Mar. 1990), pp. 56–64.

Duran, Joe W. and Simeon C. Ntafos, "An Evaluation of Random Testing," *IEEE Transactions on Software Engineering*, vol. SE–10, No. 4, (Jul. 1984), pp. 438–444.

"Is your software ready for release?" *IEEE Software*, pp. 100, 102, 108.

Littlewood, Bev, "Theories of Software Reliability: How Good Are They and How Can They Be Improved?," *IEEE Transactions on Software Engineering*, vol. SE–6, No. 5, (Sep. 1980), pp. 489–500.

Musa et al., *Software Reliability: Measurement, Prediction, Application*, McGraw–Hill, (1987), pp. 7–18, 18–20, 32–50, 77–85, 156–165, 227–252, 278–289, 388–390.

Beizer, B., *Software Testing Techniques*, 2nd Ed., Van Nostrand Reinhold, (1990), pp. 213–217, 237–240.

Grady, R., *Practical Software Metrics for Project Management and Process Improvement*, Prentice Hall, (1992), pp. 21–29, 55–67, 83–100, 158–176.

METHOD AND SYSTEM FOR DETERMINING SOFTWARE RELIABILITY

TECHNICAL FIELD

The present invention relates generally to data processing systems and, more particularly, to determining the reliability of software.

BACKGROUND OF THE INVENTION

"Software reliability" refers to the likelihood of software performing in the desired fashion without unexpectedly terminating. Measuring software reliability is a useful benchmark for deciding when a software product is ready for shipment to customers. In addition, software reliability is a useful metric for determining when to use a software product. In certain critical environments, software should not be used unless software reliability is quite high.

Many software product reliability metrics have been used in the computer industry. One such software reliability metric is the up-time of the software product. The up-time refers to the length of time that the software product has executed before the software product failed.

Software reliability metrics are typically obtained by testing the software product to yield performance data which are used to calculate the software reliability metrics. In addition to yielding performance data, testing identifies problems in the software product, which can then be fixed. One method of testing a software product is to use an automated testing system. An automated testing system is preferable to using human testers because an automated testing system can test continuously for extended periods of time and exactly as instructed. On the other hand, a human tester typically can only test continuously for shorter periods of time, and a human tester typically makes inadvertent mistakes which disrupt the testing process.

FIG. 1 depicts a block diagram of a conventional automated testing system 100. The automated testing system 100 holds a copy of the software product 102, a copy of a test program 104, a script 108, and a log file 106. The software product 102 is the software that is being tested by the automated testing system 100. The test program 104 is a program that is run to test the software product 102. The testing is conducted by sending various commands to the software product 102 to invoke the functions of the software product. The script 108 is a batch file that creates commands for the test program 104 to execute on the software product 102. The script 108 contains a random number generator and an identifier of the commands to be tested in the software product 102. The script 108 invokes the random number generator using a seed. A seed is a number which is input into a random number generator for the creation of random numbers. The output of a random number generator is a deterministic sequence of numbers. Therefore, if a seed is used twice by the same random number generator, the same sequence of numbers are generated by the random number generator. The log file 106 is used by the script 108 to store the seed for the random number generator.

In order to test the software product 102 using the conventional automated testing system 100, the test program 104 is invoked by the script 108. The script 108 generates a random number and uses the generated random number to access a list of commands for the software product 102. The list of commands used by the script 108 is a predetermined list of commands that the software product 102 executes. The random number acts as an index into the list of commands whereby the index identifies which command is to be executed in the list. After using the random number to identify a command to execute, the script 108 invokes the test program 104 to execute the command in the software product 102. The test program 104 translates the command from the script 108 into a series of keystrokes or other input that the software product 102 understands. The test program 104 then performs the input command.

The script 108 continues to generate random numbers and execute commands in the above-described fashion until the software product 102 fails. If the software product 102 does not fail, after a predetermined amount of time using one seed, another seed is chosen. The newly chosen seed is then used to generate random numbers that are then used to indicate commands for testing as described above. Each time that a new seed is chosen by the script 108, the script 108 enters the seed into the log file 106. Therefore, when the software product 102 fails, the user can view the log file 106 to determine which seed was used when the software product failed (this is known as "the failure seed"). Since the random number generator generates numbers in a deterministic fashion, the user can enter the failure seed into the script 108 and have the steps that led up to the failure replicated. However, if, for example, the failure occurs three hours after using the failure seed, the failure takes three hours to replicate because the entire sequence of random numbers generated by the random number generator prior to the failure must be again generated to recreate the failure sequence. Replicating the steps that led to a failure is desirable so that the problems in the software that caused the failure can be isolated and fixed. A tester cannot simply jump to the failure point without first reenacting the commands that preceded the failure.

Software products are also typically tested by professional human testers. The professional testers perform many of the same types of tests that are performed by the automated testing system 100. One difficulty with data obtained by professional testers is that it does not accurately reflect how users utilize the software product. Generally, professional testers tend to test parts of the program that many users do not frequently use. As a result, it is difficult to know how to apply the resulting tester data in order to obtain a reasonable measure of software reliability.

SUMMARY OF THE INVENTION

In accordance with the first aspect of the present invention, a method is executed in a computer system for determining reliability of a software product. This method determines a number of hits to failure metric for the software product. This method executes a preferred automated testing system on the software product. After executing the preferred automated testing system, this method determines the results of the preferred automated testing system. The combination of the number of hits to failure metric and the results of the preferred automated testing system provide an indication of the reliability of the software product.

In accordance with a second aspect of the present invention, an automated software testing system is provided that includes a harness script, a randomizer script, a mean time before failure (MTBF) random (Rnd) script and a wrapper script. The harness script provides for generating random numbers and for invoking the randomizer script. The randomizer script provides for receiving random numbers from the harness script and for generating commands based on the random numbers and an operational profile using a random command table. The MTBF Rnd script provides for receiving a command from the randomizer script and for generating valid random parameters for the received command. The wrapper script provides for receiving a command and parameters from the MTBF Rnd script and for executing the received command and parameters on a software product.

DETAILED DESCRIPTION OF THE INVENTION

The preferred embodiment of the present invention provides for an improved method and system for determining software reliability. The preferred embodiment of the present invention calculates a software reliability metric that weighs tester data to reflect user usage patterns. The software reliability metric of the preferred embodiment provides a more accurate indication of the reliability of a software product than conventional software reliability metrics. The preferred embodiment of the present invention also provides for an improved automated testing system. The improved automated testing system of the preferred embodiment uses an operational profile (i.e., usage patterns for different kinds of users) to target areas of the software product and uses an executable log so as to make replication of a failure scenario faster and more efficient. The improved automated testing system also generates the number of command execution hits and the elapsed time before failure. By combining the software reliability metric and the number of command execution hits and the elapsed time before failure generated by the preferred embodiment, an improved indication of the reliability of a software product is provided. Therefore, the preferred embodiment of the present invention provides two components: a mapping mechanism for generating an improved software reliability metric and an improved automated testing system.

Figure 1:
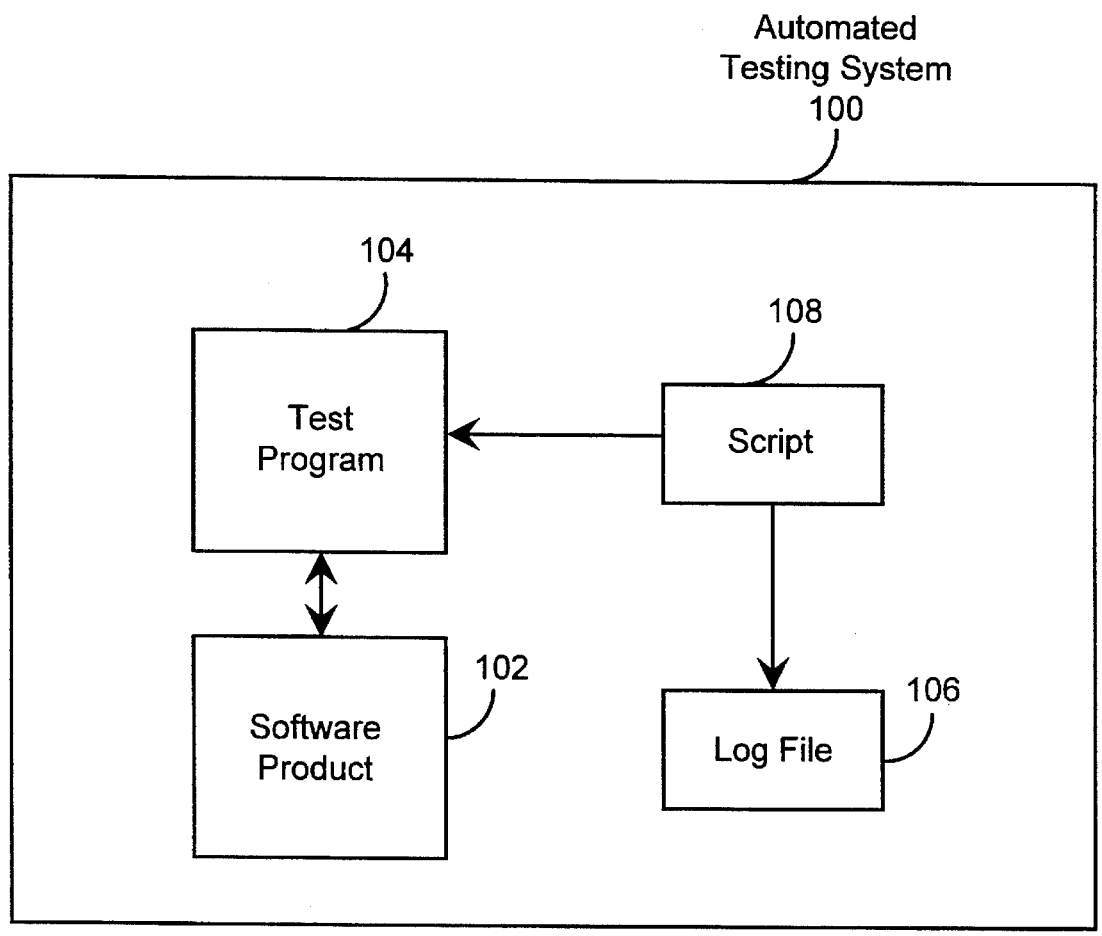
FIG. 1 depicts a block diagram of a conventional automated testing system.
Figure 2:
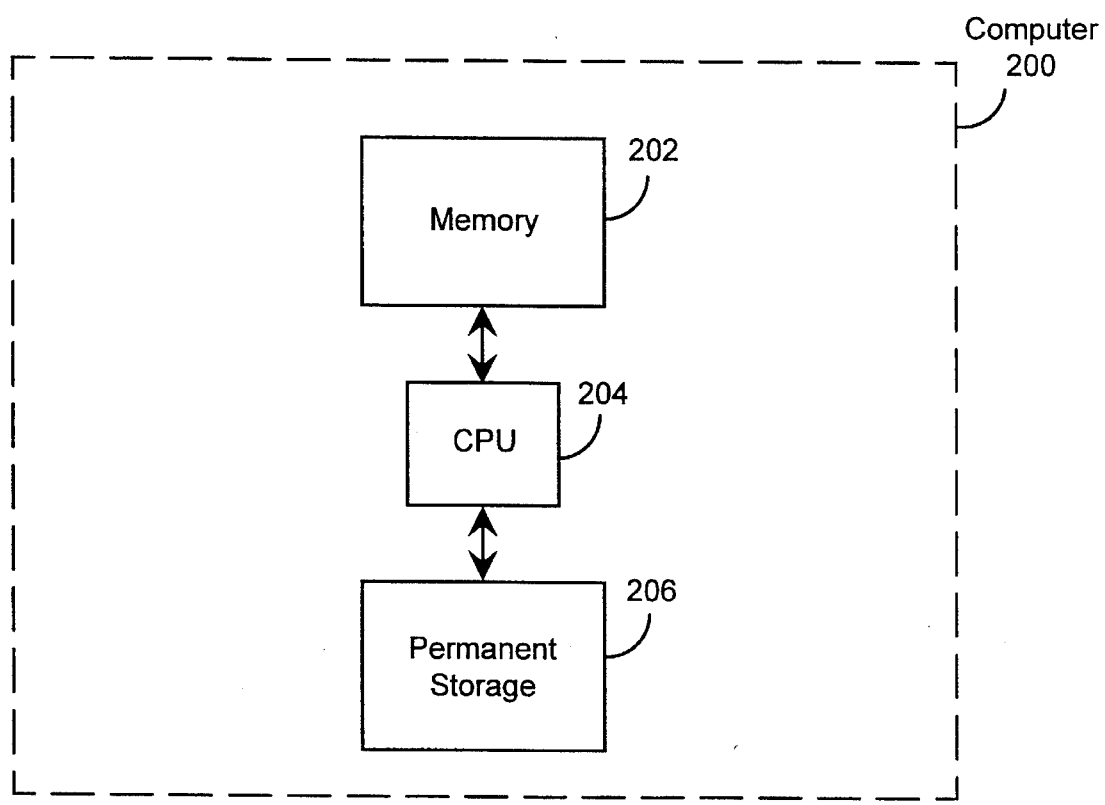
FIG. 2 depicts a block diagram of a computer suitable for practicing a preferred embodiment of the present invention.

FIG. 2 depicts a block diagram of a computer suitable for practicing a preferred embodiment of the present invention. The computer 200 contains a memory 202, a central processing unit (CPU) 204, and a permanent storage unit 206. The memory 202 acts as a storage area for computer programs as the computer programs are executed by the CPU 204. The memory 202 can be any of a number of different types of memory, including, but not limited to, dynamic random access memory (DRAM) and static random access memory (SRAM). The CPU 204 is responsible for retrieving data from the permanent storage 206, for sending the received data to the memory 202, and for executing data in the form of computer programs when the computer programs are in the memory 202. The permanent storage unit 206 is a secondary storage mechanism for storing data and computer programs between invocations of the computer 200. The permanent storage unit 206 can be any of a number of different nonvolatile storage devices, including, but not limited to, SRAM, hard disks, floppy disks, or compact disks. Although one configuration of the computer components is described, one skilled in the art will recognize that other configurations can be used.

Figure 3:
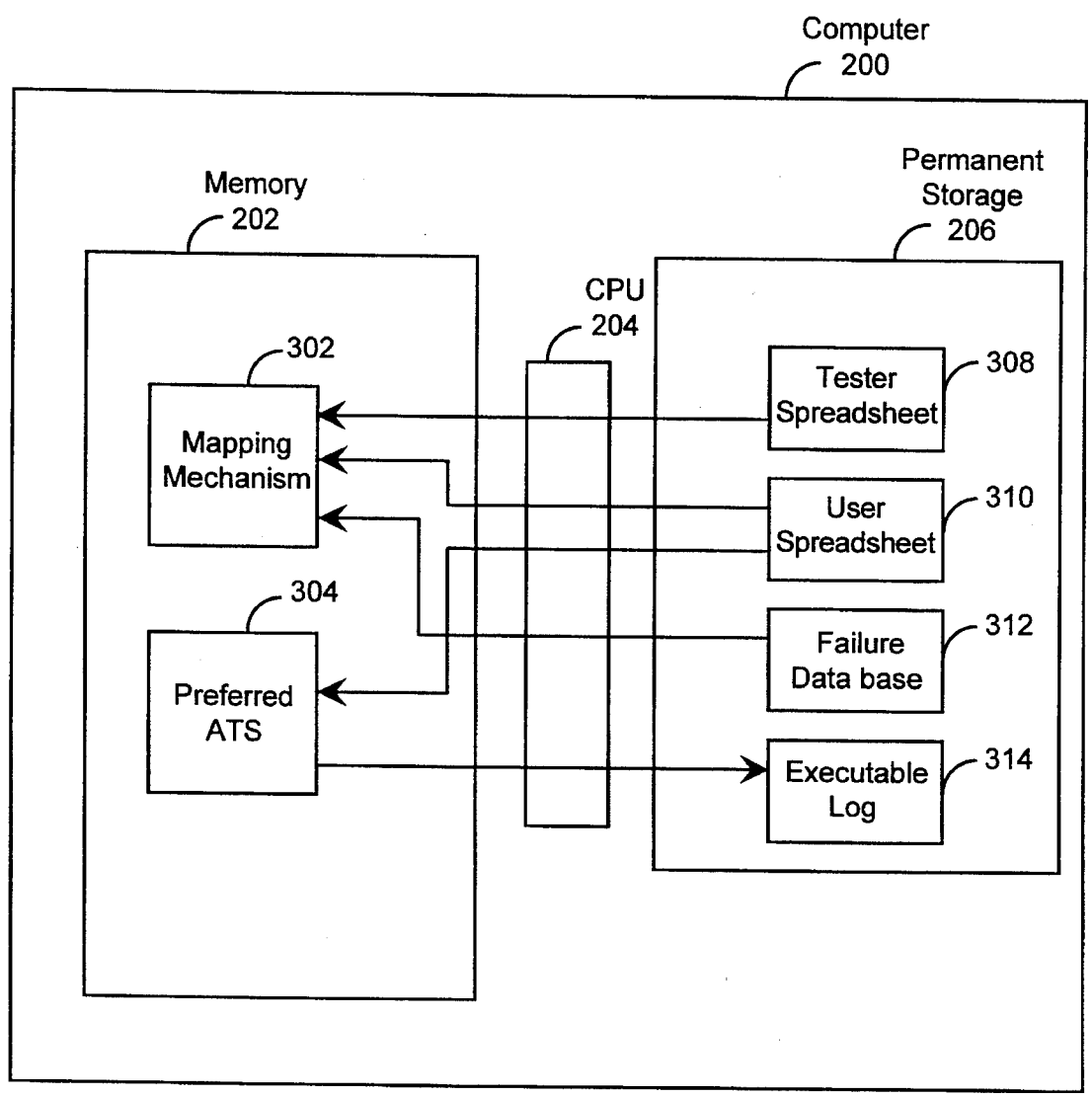
FIG. 3 depicts a more detailed block diagram of the memory and permanent storage of a computer suitable for practicing the preferred embodiment of the present invention.

FIG. 3 depicts a more detailed block diagram of the memory and the permanent storage unit of the computer 200. The memory 202 contains the mapping mechanism 302 of the preferred embodiment and the preferred automated testing system 304 (hereinafter "preferred ATS"). The permanent storage unit 204 contains a tester spreadsheet 308, a user spreadsheet 310, a failure database 312, and an executable log file 314. The mapping mechanism 302 is part of a software product being tested. For instance, the mapping mechanism may be part of a spreadsheet created by the Excel spreadsheet program sold by Microsoft Corporation of Redmond, Wash. The mapping mechanism 302 is responsible for receiving tester data from the tester spreadsheet 308, an operational profile from the user spreadsheet 310, and failure data from the failure database 312. After receiving the tester data, the operational profile, and the failure data, the mapping mechanism 302 generates a number of hits to failure (NHTF) metric (which will be described in more detail below). Tester data, operational profiles and failure data will be described in more detail below.

The preferred ATS 304 is responsible for receiving an operational profile from the user spreadsheet 310, testing a software product using commands, and storing the commands in an executable log file 314. The tester spreadsheet 308 is, for example, an Excel spreadsheet that contains tester data. The user spreadsheet 310 is an Excel spreadsheet containing operational profiles. The failure database 312 contains previously recorded failures of the software product. The executable log file 314 contains a log of commands in an executable form. The commands are recorded in the order in which they are executed by the preferred ATS. A command is in executable form when the command is in a form appropriate for processing by the entity on which the command is to operate. Although various components of the preferred embodiment are described as using the Excel spreadsheet program, one skilled in the art will recognize that other programs may be used to practice the present invention. Further, one skilled in the art will recognize that other storage mechanisms may be used instead of the spreadsheets, including, but not limited to, files, databases, computer programs, and read only memory.

The mapping mechanism 302 creates a more accurate software reliability metric by combining tester data, failure data, and an operational profile. The term "tester data" refers to information recorded by a recording mechanism when human testers test the current release of a software product. The recording mechanism records the number of times that each command is executed 312 for each area of the software product. An area of a software product is a logical grouping of commands that the software product executes. For example, in a word processing program, all commands that manipulate a file, such as open, create, and close, may be considered to be one area. Further, all commands dealing with font manipulation may be considered to be another area. In addition, the recording mechanism stores all failures into a failure database. The failure database 312 stores software product failures ("failure data") categorized by the area of the software product in which the failure occurred. "Area failure" refers to when a command in an area fails to perform correctly, causes the software product to fail or the command is unable to perform. The failure data may originate from different sources, but for purposes of the discussion below it is assumed that this data is acquired and recorded when the tester tests the software product. Alternatively, this data may be acquired and recorded when the preferred ATS tests the software product.

The term "operational profile" refers to information obtained from a release of a software product that was used by users. In order to create an operational profile, a release of the software product to be tested is distributed with a recording mechanism to various groups of users that records each command and how long the command took to execute ("user data"). From the user data, an operational profile is created. The operational profile is a breakdown of the number of commands that were executed per area. Operational profiles are gathered from users falling into different levels of sophistication. Hence, there may be a first operational profile that is derived from data gathered for unsophisticated users, a second operational profile that is derived from data gathered for moderately sophisticated users, and a third operational profile that is derived from data gathered for sophisticated users. The operational profile, thus, provides a mapping of various groups of users by their sophistication to each area and provides the number of times that each area was used. By creating an operational profile, an ability is provided for testing a software product for groups of users with differing levels of sophistication.

Figure 4:
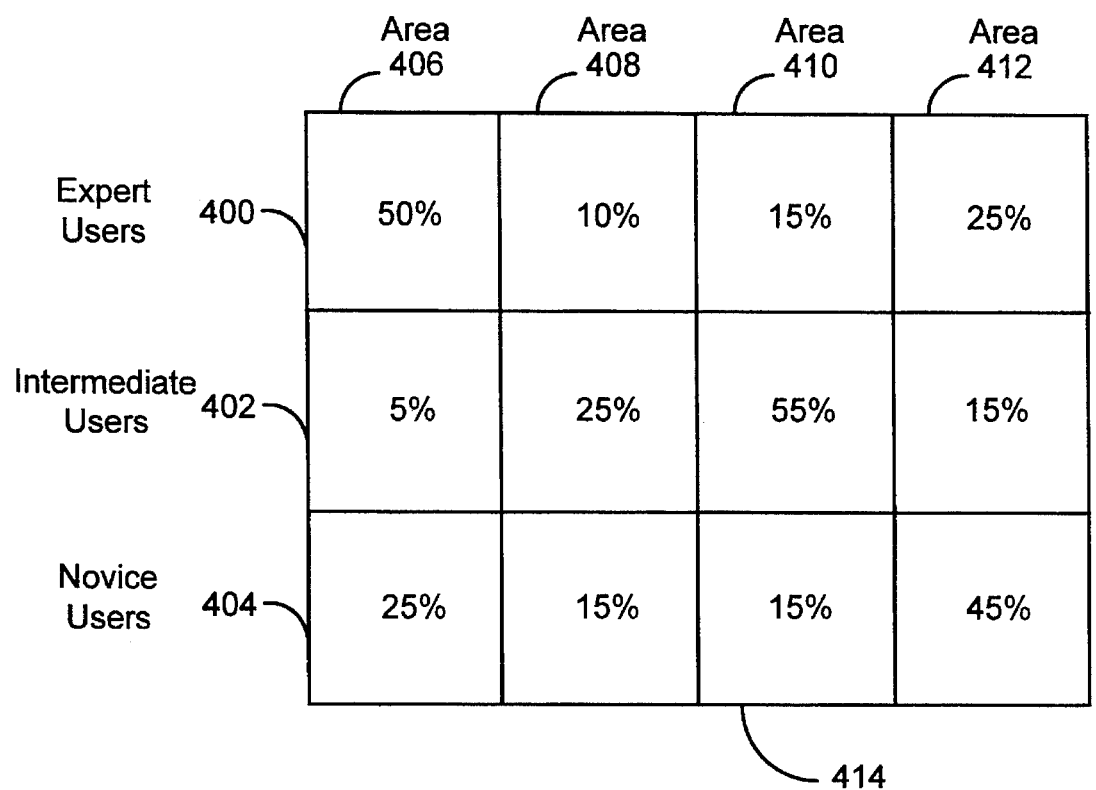
FIG. 4 depicts an example operational profile for three user groups in accordance with the preferred embodiment of the present invention.

FIG. 4 depicts an example of an operational profile for three groups of users. The three groups of users are the expert users group 400, the intermediate users group 402 and the novice users group 404. The software product being tested has four areas: area 406, area 408, area 410, and area 412. The groups of users and the areas of the software intersect to from a table 414. The table 414 indicates the percentage of use ("user percentage") for each user group for each area of the software product. For example, the area most used by the expert user group 400 is area 406. That is, the expert users group 400 uses commands in area 406 of the software product 50% of the time that the expert users group 406 uses the software product.

Figure 5:
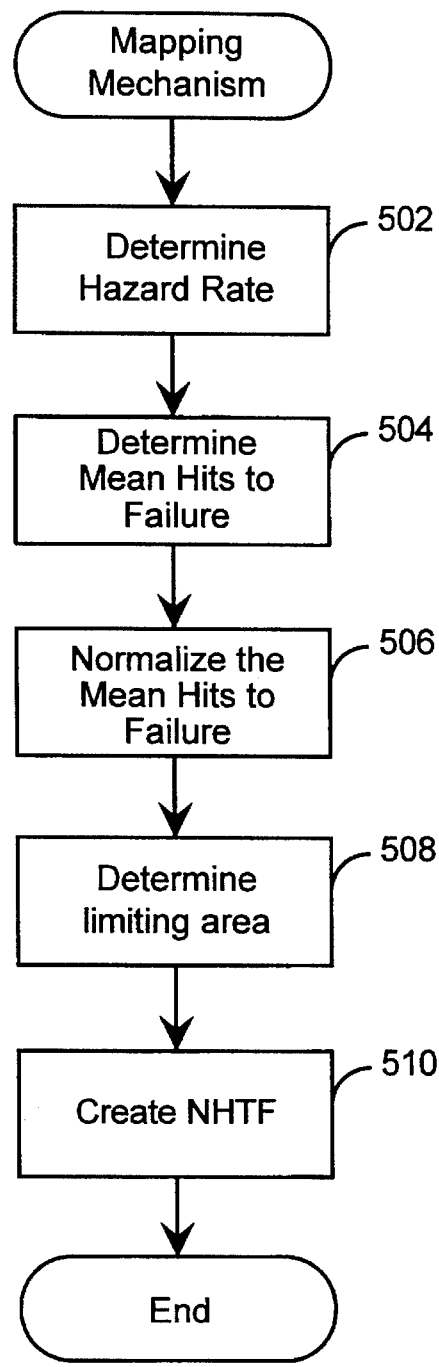
FIG. 5 depicts a flowchart of the steps performed by the mapping mechanism of the preferred embodiment of the present invention.

FIG. 5 depicts a flowchart of the steps performed by the mapping mechanism 302 of the preferred embodiment. The mapping mechanism 302 is responsible for receiving tester data from the tester spreadsheet 308, an operational profile from the user spreadsheet 310 (selected by the party that wishes to obtain the hits-to-failure metric), and failure data from the failure database 312. After receiving the tester data, an operational profile and the failure data, the mapping mechanism 302 creates a number of hits to failure ("NHTF") metric. The first step performed by the mapping mechanism is to determine the hazard rate (step 502). The mapping mechanism determines the hazard rate by dividing the failures in each area by the number of hits on each area (area hits). A hit refers to one execution of a command. The failures in each area is received from the failure database 312 and the area hits is part of the tester data received from the tester spreadsheet 308. After the hazard rate is determined, the mapping mechanism 302 determines the mean hits-to-failure (step 504). The mapping mechanism 302 determines the mean hits-to-failure by inverting the hazard rate. Next, the mapping mechanism 302 normalizes the mean hits-to-failure (step 506). The mapping mechanism 302 normalizes the mean hits-to-failure by dividing the mean hits-to-failure for each area of the software product by the total mean hits-to-failure for all of the areas of the software product. Then, the mapping mechanism 302 determines the limiting area (step 508). The mapping mechanism 302 determines the limiting area by dividing the normalized mean hits-to-failure for each area of the software product by the user percentage for that area from the operational profile to create a "mean hits-to-failure over user data." The mapping mechanism 302 selects the area with the lowest mean hits-to-failure over user data as the limiting area. After determining the limiting area, the mapping mechanism 302 creates the NHTF metric (step 510). The mapping mechanism 302 creates the NHTF metric by dividing the mean hits-to-failure of the limiting area by the user percentage for that area. After the hits-to-failure metric is created, processing ends. As a result, a metric is calculated that weighs the tester data results according to the operational profile. In other words, it places more emphasis on failures in areas that are frequently used by the user having the operational profile and less emphasis on failures in areas that are infrequently used by the user having the operational profile.

The second component of the preferred embodiment of the present invention is the preferred ATS 304. The preferred ATS 304 tests a software product automatically and records the number of hits that occurred before failure and the length of time to elapse before failure. By using the results of the preferred ATS 304, an indication of the reliability of the software product is placed in terms of real time and real results.

Figure 6:
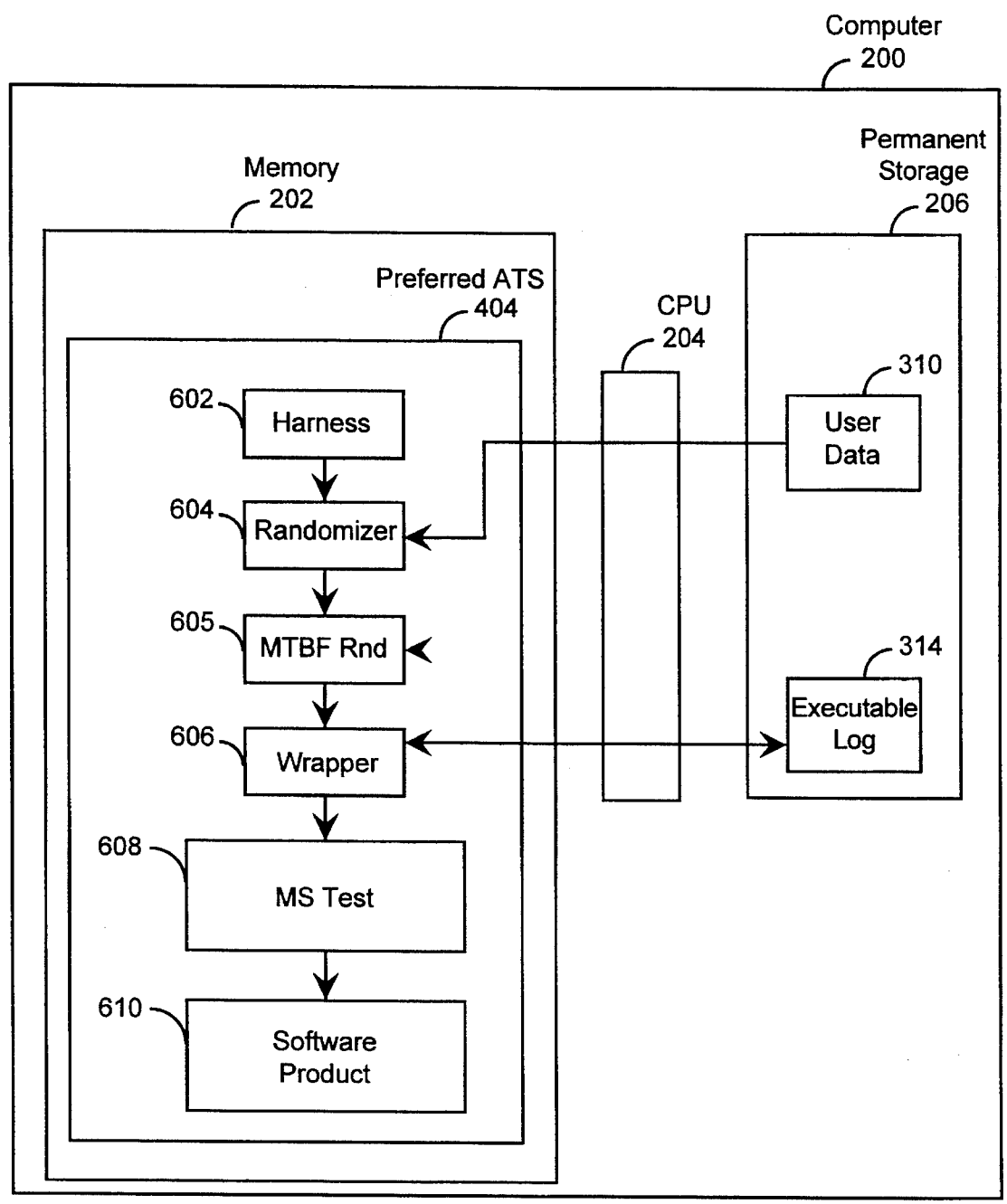
FIG. 6 depicts a more detailed block diagram of a preferred automated testing system of the preferred embodiment of the present invention.

FIG. 6 depicts a more detailed block diagram of the preferred ATS 304. The preferred ATS 304 contains a harness script 602, a randomizer script 604, a mean time before failure random (MTBF Rnd) script 605, a wrapper script 606, an MS test program 608, and a software product 610. The preferred ATS 304 uses the user spreadsheet 310 and the executable log file 314 of the permanent storage 304. A script is a batch file containing commands for execution by a computer program. Since a script controls the operations of a computer program, a script in a computer system performs a similar function to a script in a play. The executable log file 314 stores commands in an executable from. Since the preferred ATS 304 understands the Beginner's All-Purpose Symbolic Instruction Code ("BASIC") computer language, the executable log file 314 stores commands using the BASIC computer language format. Although the preferred embodiment is described as using the BASIC computer language, one skilled in the art will recognize that other computer languages or command formats may be used. The harness script 602 is responsible for the overall execution of the preferred ATS 304. The randomizer script 604 is responsible for generating random numbers and determining a command to execute based on the operational profile provided by the user spreadsheet 310. The MTBF Rnd script 605 is responsible for generating parameters that are required to invoke a command (e.g., parameters for a function call). The wrapper script 606 receives a command from the randomizer script 604, writes the command in an executable form into the executable log file 314, and invokes the command through the MS test program 608. Although the preferred embodiment is described as using the MS test program available from Microsoft Corporation of Redmond, Wash., one skilled in the art will recognize that other test programs can be used. The MS test program 608 is responsible for receiving commands from the wrapper script 606 and convening the commands into a format recognizable by the software product 610. The software product 610 can be any software product for testing. The user spreadsheet 310 contains the operational profile. Although the preferred ATS is described as using one operational profile, the preferred ATS is intended to be executed with the operational profile of every user group so as to create an indication of the reliability of the software product across the spectrum of user groups.

The executable log file 314 is responsible for storing all commands that are executed by the wrapper script 606. The executable log file 314 can also act as input to the wrapper script 606 and, thus, recreate the steps that led to the failure (i.e., recreate "the failure scenario"). By recreating the failure scenario using this approach, the developers of the software product 610 can isolate and fix problems with the software product 610 much faster and more efficiently than in the prior art. There is no need to generate all the commands leading up to the point of failure through the use of a random number generator as conventional systems required. Rather, the executable log file 314 can be modified to produce the least amount of commands necessary for replicating the failure scenario.

Although various components of the preferred ATS are described as being scripts, one skilled in the art will recognize that the scripts may be processes, subroutines, libraries or other software components.

Figure 7:
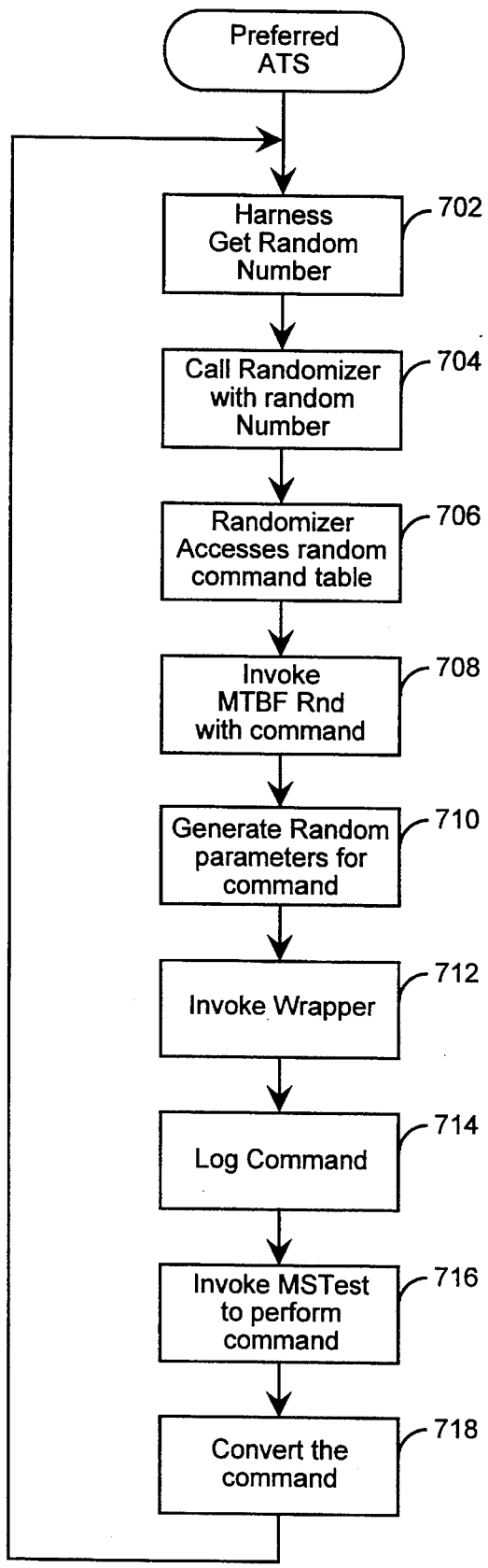
FIG. 7 depicts a flowchart of the steps performed by the preferred automated testing system of the preferred embodiment of the present invention.

FIG. 7 depicts a flowchart of the steps performed by the preferred ATS of the preferred embodiment of the present invention. The preferred ATS 304 is responsible for receiving an operational profile from the user spreadsheet 310, for testing the software product 610, and for storing each command executed on the software product 610 into the executable log file 314. The first step performed by the preferred ATS 304 is that the harness script 602 generates a random number (step 702). The harness script 602 generates a random number by invoking a random number generator. The harness script 602 then invokes the randomizer script 604 with the generated random number (step 704). The randomizer script 604 inputs the random number as an index into a random command table to determine a command for execution (step 706). The random command table is a table of commands executable by the software product 610 based on the operational profile in the user spreadsheet 310. For example, in a word processing program, if the operational profile in the user spreadsheet 310 reflected that 50% of the users in the operational profile used the file area of the word processing program, and only 10% of the users used the font area of the word processing program, the random command table would be adjusted so that the file area would be five times more likely to be executed than the font area.

After inputting the random number as an index into the random command table, the randomizer script 604 receives a command for execution. The randomizer script 604 invokes the MTBF Rnd script 605 with the received command (step 708). The MTBF Rnd Script 605 then generates a random set of parameters for the command (step 710). The MTBF Rnd Script 605 generates parameters which are random by using a random number generator. The MTBF Rnd script 605 massages the random parameters to ensure that the parameters are within a valid range for the command (i.e., the parameters are acceptable to the command). Next, the MTBF Rnd script 605 invokes the wrapper script 606 with the selected command and the parameters for the selected command (step 712). The wrapper script 606 stores the selected command with the parameters for the selected command into the executable log file 314 (step 714). The wrapper script 606 then invokes the MS test program 608 to perform the selected command on the software product 610 with the parameters for the selected command (step 716). The wrapper script 606 invokes the MS test program 608 to perform the command by selecting a function within the MS test program 608 that performs the selected command. The selected function in the MS test program 608 then converts the command into the appropriate actions for the execution of the command on the software product 610 (step 718). For example, if the software product 610 is a word processing program and the selected command is to open a file, the command "File Open" may be translated into "pointing the mouse onto the file pull-down menu, clicking the mouse and dragging the mouse pointer to the open selection." After the command has been executed by the software product 610, the preferred ATS 304 then continues to step 702 and processing continues. The preferred ATS 304 continues testing until a user intervenes or the software product 610 fails.

Figure 8:
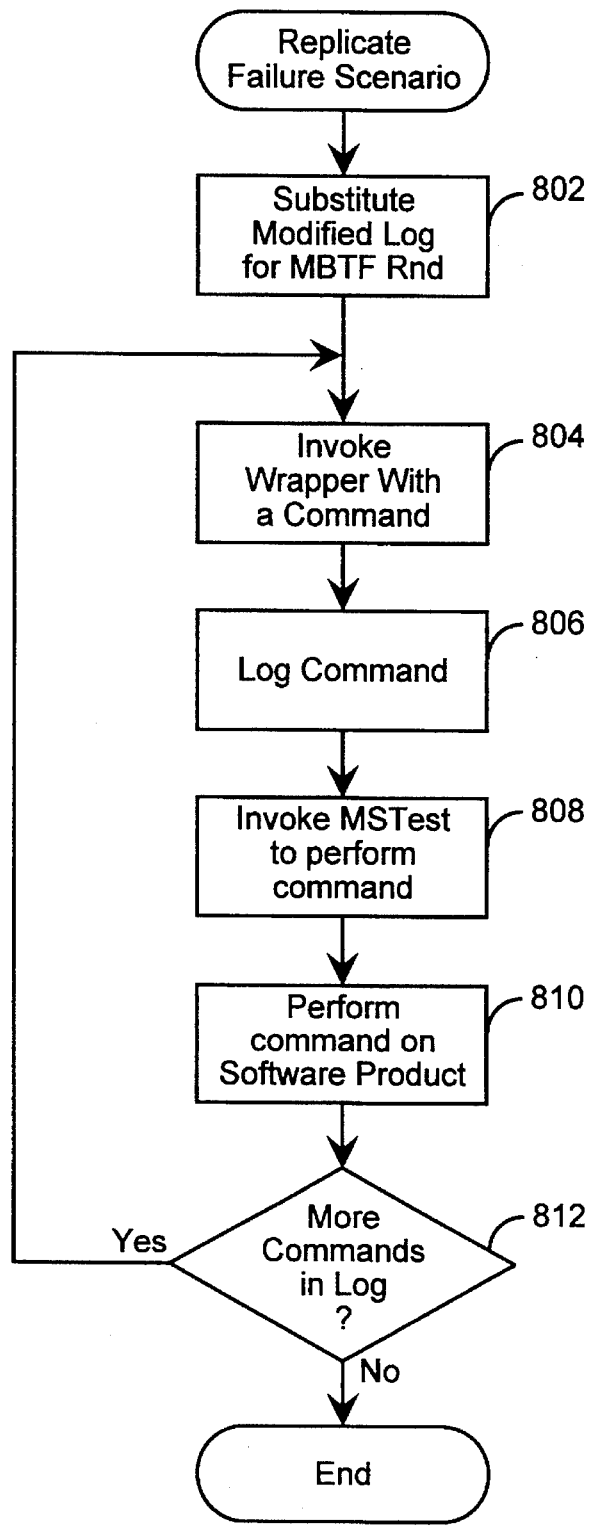
FIG. 8 depicts a flowchart of the steps performed to replicate a failure scenario by the preferred automated testing system.

FIG. 8 depicts a flow chart of the steps performed using the executable log file 314 to replicate a failure scenario. Since the executable log file 314 contains the executable form of the commands that led up to a failure of the software product 610, the preferred embodiment of the present invention provides a fast and efficient manner for replicating a failure scenario. As described above, not all of the commands preceding failure need to be performed again to recreate the failure. As a result, the recreation of the failure scenario may be more quickly performed than in conventional systems. First, the executable log file 314 is modified and substituted for the MTBF Rnd script 605 (step 802). The executable log file 314 is modified so as to reduce the number of commands contained in the executable log file 314 for replicating the failure scenario. Modification of the executable log file 314 can be achieved through the use of a word processing program or a text editor. Those skilled in the art will appreciate that the nature of the changes required depends on the software product being tested. Next, the wrapper script 606 is invoked with a command from the modified log file (step 804). The wrapper script 606 stores the received command in the executable log file 314 (step 806). The wrapper script 606 then invokes the MS test program 608 to perform the received command (step 808). The MS test program 608 performs the received command on the software product 610 (step 810). If there are more commands contained in the modified log file, processing continues to step 804 wherein another command is processed (step 812). However, if no more commands are contained within the modified log, processing ends.

While the present invention has been described with reference to a preferred embodiment thereof, those skilled in the art will know of various changes in form that may be made without departing from the spirit and scope of the claimed invention as defined in the appended claims.

What is claimed is:

1. In a computer system having a processor, a memory containing a software product, and a storage device, the software product having areas, wherein each area is a grouping of commands recognized by the software product, a method of creating a software reliability metric for the software product comprising the steps of:

executing the software product on the processor at least once by testers;

for each execution of the software product, storing tester data generated by the testers into the storage device wherein the tester data contains a number of times an area is used; and storing a number of failures per area of the software product into the storage device;

storing an operational profile for a group of users into the storage device wherein the operational profile indicates a frequency of use for each area of the software product by the group of users;

calculating a software reliability metric that weighs the stored tester data to reflect the stored operational profile and the stored number of failures per area;

determining whether the software product is reliable by examining the software readability metric; and testing the software product to reveal deficiencies therein when it is determined that the software product is unreliable.

2. The method of claim 1 wherein the step of calculating a software reliability metric includes the steps of:

for each area in the software product,
calculating a hazard rate by dividing the number of failures in the area by the number of times the area is used;
inverting the hazard rate to obtain a mean hits to failure;
normalizing the means hits to failure to create a normalized mean hits to failure; and
dividing the normalized mean hits to failure by the frequency of use for the area to create a mean hits to failure over user data for the area;

selecting a limiting area by selecting a lowest mean hits to failure over user data of the areas of the software product; and creating a number of hits to failure metric by dividing the mean hits to failure of the limiting area by the frequency of use of the limiting area.

3. In a computer system, a method for automatically testing a software product comprising the steps of:

providing a list of commands that are executable by the software product;

providing an operational profile that specifies, for each command in the list of commands, a likelihood that a user will invoke the command;

generating random numbers to be used as indexes into the list of commands; and for each random number generated,
selecting a command to be invoked from the list of commands by using the random number as an index reflecting the likelihoods of the operational profile;
generating random parameters for the selected command;
executing the selected command on the software product; and
storing the selected command and parameters into an executable log file.

4. The method of claim 3 wherein the step of selecting a command includes the step of:

accessing a random command table using the random number as an index, wherein the index indicates a command and wherein the random command table is adjusted according to an operational profile.

5. The method of claim 3 wherein the step of generating random parameters includes the steps of:

for each parameter of the command,
determining a valid range for the parameter; and
randomly selecting a parameter for the command within the valid range.

6. In a data processing system that receives user input, the data processing system having a processor, a memory containing an automated testing system and a software product, and a storage device containing an executable log file for storing commands, the automated testing system having a script for generating commands, for storing commands into the executable log file and for executing commands, and the software product for receiving commands from the script for testing, a method of replicating a failure of the software product comprising the steps of:

running the software product on the processor;

running the automated testing system on the processor;

generating commands by the script of the automated testing system wherein the automated testing system repeatedly executes the commands on the software product and stores the commands into the executable log file until the software product fails;

modifying the executable log file to minimize the number of commands for replicating the failure of the software product in response to user input;

replacing the script with the modified executable log file such that the software product receives commands from the executable log file; and running the software product on the processor such that the software product executes the commands in the modified executable log file.

7. In a computer system having a software product with an associated reliability, wherein the software product has areas, wherein each area is a grouping of commands recognized by the software product, a method of determining the reliability of the software product comprising the steps of:

receiving tester data wherein the tester data contains a number of invocations of each area of the software product;

receiving an operational profile for a group of users which indicates a frequency of use for each area of the software product by the group of users;

receiving a number of failures per area of the software product;

calculating a software reliability metric that weighs the tester data to reflect the operational profile and the number of failures per area;

determining whether the software product is reliable by examining the software metric; and when it is determined that the software product is not reliable,
testing the software product with an automated testing system to reveal deficiencies in the software product.

8. The method of claim 7 wherein the step of calculating a software reliability metric includes the steps of:

for each area in the software product,
calculating a hazard rate by dividing the number of failures in the area by the tester data for the area;
inverting the hazard rate to obtain a mean hits to failure;
normalizing the means hits to failure to create a normalized mean hits to failure;
dividing the normalized mean hits to failure by the frequency of use for the area to create a mean hits to failure over user data for the area;

selecting a limiting area by selecting a lowest mean hits to failure over user data of the areas of the software product; and creating a number of hits to failure metric by dividing the mean hits to failure by the frequency of use of the limiting area.

9. The method of claim 7 wherein the step of testing the software product includes the steps of:

generating random numbers; and for each random number generated,
  generating a command using the random number and using an operational profile;
  generating random parameters for the command;
  executing the generated command and parameters on the software product;
  storing the generated command and parameters into an executable log file; and
  determining a number of hits performed on the software product and a length of time that the software product executed before a deficiency is revealed.

10. The method of claim 9 wherein the step of generating a command includes the step of:

accessing a random command table using the random number as an index, wherein the index indicates a command and wherein the random command table is adjusted according to an operational profile.

11. The method of claim 9 wherein the step of generating random parameters includes the steps of:

for each parameter of the command,
  determining a valid range for the parameter; and
  selecting a random parameter for the command within the valid range.

12. A computer system for automatically testing software products, comprising:

a memory containing a software product for testing, a generator component for generating random numbers, a command component for receiving the generated random numbers from the generator component and for generating commands using the generated random numbers as an index into a random command table, the random command table adjusted according to an operational profile of a user group, a parameter component for receiving the generated commands from the command component and for generating valid random parameters for the generated commands, and an execution component for receiving the generated commands and the generated parameters from the parameter component, for storing the generated commands and generated parameters in an executable form, and for executing the generated commands and generated parameters on the software product;

a storage device containing an executable log for receiving the generated commands from the execution component and for storing the generated commands in an executable form; and a processor for running the software product, the generator component, the command component, the parameter component and the execution component.

13. In a data processing system having a processor, a memory containing a software product for testing and an automated testing system, and a storage device containing an executable log file for storing commands, the automated testing system having a harness script for generating random numbers, a randomizer script for generating commands based on random numbers, an MTBF Rnd script for generating random valid parameters for a command, and a wrapper script for storing a command and parameters into the executable log file and for executing the command and parameters, a method of replicating a failure of the software product comprising the steps of:

running the software product on the processor;

running the automated testing system on the processor;

generating commands and parameters for the commands by the automated testing system, wherein the commands and the parameters are generated by the harness script generating random numbers, the randomizer script generating the commands based on the random numbers, and the MTBF Rnd script randomly generating the parameters for each command;

executing the commands with the parameters on the software product by the automated test system, such that the wrapper script of the automated test system repeatedly executes the commands with the parameters on the software product and stores the commands with the parameters into the executable log file until the software product fails;

modifying the executable log file to minimize a number of commands for replicating the failure of the software product in response to user input;

substituting the modified executable log file for the harness script, the randomizer script and the MTBF Rnd script in response to user input;

invoking the wrapper script with the modified executable log file; and running the software product on the processor such that the software product executes the commands with the parameters in the modified executable log file.

* * * * *